(12) United States Patent
Sabo (10) Patent No.: US 12,304,149 B2
(45) Date of Patent: May 20, 2025

(54) METHOD OF MANUFACTURING A THREE-DIMENSIONAL ARTICLE

(71) Applicant: 3D Systems, Inc., Rock Hill, SC (US)

(72) Inventor: David Sabo, San Diego, CA (US)

(73) Assignee: 3D Systems, Inc., Rock Hill, SC (US)

( * ) Notice: Subject to any disclaimer, the term of this patent is extended or adjusted under 35 U.S.C. 154(b) by 504 days.

(21) Appl. No.: 17/876,239

(22) Filed: Jul. 28, 2022

(65) Prior Publication Data

US 2022/0379566 A1 Dec. 1, 2022

Related U.S. Application Data

(62) Division of application No. 16/830,644, filed on Mar. 26, 2020, now Pat. No. 11,433,618.

(Continued)

(51) Int. Cl.
*B29C 64/393* (2017.01)
*B29C 64/135* (2017.01)
*B29C 64/245* (2017.01)
*B29C 64/255* (2017.01)
*B29C 64/264* (2017.01)
*B33Y 10/00* (2015.01)
*B33Y 30/00* (2015.01)
*B33Y 50/02* (2015.01)

(52) U.S. Cl.
CPC .......... *B29C 64/393* (2017.08); *B29C 64/135* (2017.08); *B29C 64/245* (2017.08); *B29C 64/255* (2017.08); *B29C 64/264* (2017.08); *B33Y 10/00* (2014.12); *B33Y 30/00* (2014.12); *B33Y 50/02* (2014.12)

(58) Field of Classification Search
CPC ..... B29C 64/364; B29C 64/10; B29C 64/135; B29C 64/393; B29C 64/264; B29C 64/265; B29C 64/255; B33Y 10/00; B33Y 30/00; B33Y 50/02
See application file for complete search history.

(56) References Cited

U.S. PATENT DOCUMENTS

2016/0303795 A1* 10/2016 Liu ................ B29C 64/364
2017/0217052 A1* 8/2017 Wu ................. B29C 33/68
(Continued)

FOREIGN PATENT DOCUMENTS

CN 108943715 12/2018
WO 2012021940 2/2012
(Continued)

OTHER PUBLICATIONS

English Translation of Japanese Application No. 2021-557360, dated Oct. 11, 2022 (4 pages).
(Continued)

*Primary Examiner* — Edmund H Lee (57) ABSTRACT

A three-dimensional printing system includes a support plate and a resin vessel. The support plate defines a central opening and an upper surface. The resin vessel is disposed upon the upper surface of the support plate and includes a substructure and a transparent sheet. The substructure includes a vertical wall and a tension ring that extends inwardly and downwardly from the vertical wall. The tension ring impinges downwardly upon an upper surface of the transparent sheet and tensions the transparent sheet.

16 Claims, 8 Drawing Sheets

Related U.S. Application Data

(60) Provisional application No. 62/824,729, filed on Mar. 27, 2019.

(56) References Cited

U.S. PATENT DOCUMENTS

| | | |
|---|---|---|
| 2018/0056587 A1* | 3/2018 | Arai .................. B29C 64/188 |
| 2018/0071976 A1 | 3/2018 | Tumbleston et al. |

FOREIGN PATENT DOCUMENTS

| | | | |
|---|---|---|---|
| WO | 2016123506 | | 8/2016 |
| WO | 2018006018 | | 1/2018 |
| WO | 2018111533 | | 6/2018 |
| WO | WO2018/170544 | * | 9/2018 |

OTHER PUBLICATIONS

English Machine Translation of Chinese Patent Application Publication No. 108943715 (18 pages).

* cited by examiner

METHOD OF MANUFACTURING A THREE-DIMENSIONAL ARTICLE

CROSS REFERENCE TO RELATED APPLICATIONS

This application is a continuation of U.S. application Ser. No. 16/830,644, now U.S. Pat. No. 11,433,618, which was filed on Mar. 26, 2020, which claims priority to U.S. Provisional Application Ser. No. 62/824,729, Entitled "LARGE AREA THREE -DIMENSIONAL PRINTER WITH PRECISION OPTICAL PATH" by David Sabo, filed on Mar. 27, 2019, incorporated herein by reference under the benefit of U.S.C. 119 (e).

FIELD OF THE INVENTION

The present disclosure concerns an apparatus and method for fabrication of solid three dimensional (3D) articles of manufacture from radiation curable (photocurable) resins. More particularly, the present disclosure improves an optical path for a large area stereolithography-based printer.

BACKGROUND

Three dimensional (3D) printers are in rapidly increasing use. One class of 3D printers includes stereolithography printers having a general principle of operation including the selective curing and hardening of radiation curable (photocurable) liquid resins. A typical stereolithography system includes a resin vessel holding the photocurable resin, a movement mechanism coupled to a support tray, and a controllable light engine. The stereolithography system forms a three dimensional (3D) article of manufacture by selectively curing layers of the photocurable resin onto a surface of the support tray. Each selectively cured layer is formed at a "build plane" within the resin.

One variant of this type of system defines a build plane between a lower face of the support tray and a flexible, transparent sheet. One challenge with such a system is to enable the formation of articles having a large lateral area.

SUMMARY

In a first aspect of the disclosure, a three-dimensional printing system includes a support plate and a resin vessel. The support plate defines a central opening and an upper surface. The resin vessel is disposed above the upper surface of the support plate and includes a substructure and a transparent sheet. The substructure includes a vertical wall and a tension ring that extends inwardly and downwardly from the vertical wall. The tension ring impinges downwardly upon an upper surface of the transparent sheet and tensions the transparent sheet.

In one implementation the tension ring includes a generally horizontal outer portion that extends inwardly from the vertical wall. A frame is mounted under the generally horizontal outer portion of the tension ring and proximate to the vertical wall. The frame clamps an outer periphery of the transparent sheet. The tension ring includes a sloped inner portion that defines an oblique angle with respect to a vertical axis. The sloped inner portion extends inwardly and downwardly from the outer portion of the tension ring and to an inner edge. The inner edge of the tension ring impinges upon an inner boundary of the transparent sheet to tension the transparent sheet.

In another implementation an inward facing surface of the vertical wall, upper surfaces of the tension ring, and the transparent sheet provide containment for photocurable resin.

In yet another implementation the vertical wall includes an upper portion that extends above the tension ring and a lower portion that extends below the tension ring. The upper portion defines an upper inside surface for laterally confining photocurable resin. The lower portion has a lower end perimeter that rests against the upper surface of the support plate.

In a second aspect of the disclosure, a three dimensional printing system includes a support plate, a resin vessel, a controllable pressure source, a movement mechanism coupled to a support tray, a light engine, and a controller. The support plate defines a central opening that is closed with a transparent plate. The resin vessel is disposed above the support plate and includes a tensioned transparent sheet and a substructure. The transparent sheet is supported above the transparent plate to define a gap therebetween. The substructure provides lateral resin containment above the transparent sheet and seals to the support plate to provide a sealed space between the transparent plate and the transparent sheet. The controllable pressure source is fluidically coupled to the sealed space. The support tray defines a lower surface that supports a three-dimensional article above the transparent sheet. The light engine transmits radiation up through the transparent sheet and to a build plane above the transparent sheet. The controller is at least coupled to the movement mechanism, the light engine, and the controllable pressure source.

In one implementation the controller is configured to operate the controllable pressure source to modulate the gap between the transparent sheet and transparent plate during fabrication of the three-dimensional article. Modulating the gap can include pressing the transparent sheet onto the transparent plate. The controller is configured to operate the light engine while the transparent plate is pressed against the transparent plate.

In another implementation the controller is configured to operate the light engine to selectively harden resin at the build plane while operating the controllable pressure source to negatively pressurize the transparent sheet. The controller is configured to operate the controllable pressure source to positively pressurize the transparent sheet after operating the light engine.

In a third aspect of the invention, a method of fabricating a three-dimensional article includes tensioning a transparent sheet above a transparent plate with a sealed gap therebetween, operating a movement mechanism to position a support tray with a lower face of the three-dimensional article at a build plane above the transparent sheet, operating a pressure source to apply a negative gauge pressure to the sealed gap, and operating a light engine to selectively harden photocurable resin at a build plane and onto the lower face concurrent with the application of negative gauge pressure.

In one implementation the pressure application modulates the gap to align the build plane with the lower face. The pressure application can press the transparent sheet against the transparent plate.

In another implementation the pressure source is operated to apply a positive gauge pressure to the transparent sheet. The positive gauge pressure application can lift the transparent sheet up from the transparent plate. The movement mechanism can be operated to raise the lower face to a new build plane location concurrent with applying the positive gauge pressure.

DETAILED DESCRIPTION OF THE PREFERRED EMBODIMENTS

Figure 1:
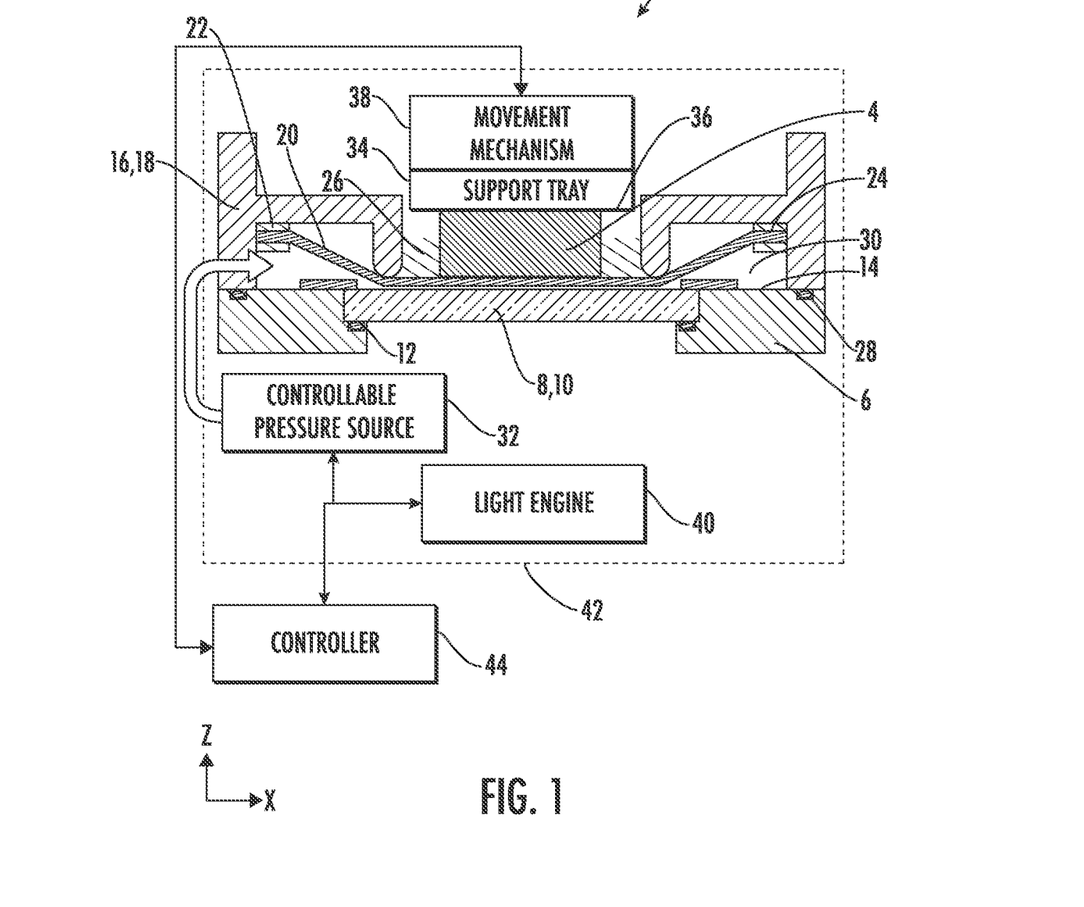
FIG. 1 is a schematic diagram depicting an embodiment of a three-dimensional printing system.

FIG. 1 is a schematic diagram depicting an embodiment of a three-dimensional printing system 2 for fabricating a three-dimensional article 4. In describing system 2, axes X, Y, and Z can be used. Axes X and Y are generally horizontal and axis Z is generally vertical and generally aligned with a gravitational reference. As discussed herein, the term "generally" refers to having a dimension, an angle, or other parameter that is within manufacturing or placement tolerances.

A support plate 6 defines a central opening 8 closed by a transparent plate 10. Transparent plate 10 can be formed from any rigid and optically clear material such as glass or quartz. Alternatively, the transparent plate can be formed from an organic or polymer material such as acrylic. The acrylic can have a degree of flexibility. An O-ring 12 is disposed between a periphery of the transparent plate 10 and an upper surface 14 of the support plate 6.

A resin vessel 16 is supported by the support plate 6. The resin vessel 16 includes a substructure 18, a transparent sheet 20, and a frame 22. The frame 22 supports and clamps an outer periphery 24 of the transparent sheet 20. The substructure 18 is configured to tension the transparent sheet 20 and to contain a photocurable resin 26 in cooperation with the transparent sheet 20.

In one embodiment, the transparent sheet 20 is a flexible polymer sheet having a chemical resistance to photocurable resin while allowing transmission of oxygen as an inhibitor. The transparent sheet is generally transparent to ultraviolet (UV), violet, or blue light. The polymer sheet may include one or more polymers such as polyvinylidene fluoride (PVDF), ethylenchlorotrifluoroethylene (ECTFE), ethyl enetetrafluoroethylene (ETFE), polytetrafluoroethylene (PTFE), perfluoroalkoxy (PFA), fluorinated ethylene propylene (FEP), polyvinylidene fluoride (PVDF) or other materials known in the art. The polymer sheet can include amorphous thermoplastic fluoropolymer films such as TEFLON AF 1600™ or TEFLON AF 2400™. Other materials are possible.

The substructure 18 is supported by the upper surface 14 of the support plate 6. An O-ring 28 seals the substructure 18 to the upper surface 14 to define a sealed space 30 that is bounded by the glass plate 10, the transparent sheet 20, and the substructure 18. In the illustrated embodiment, a controllable gas pressure source 32 is fluidically coupled to the sealed space 30.

A pressure of the controllable gas pressure source 32 can be controllably modulated between negative and positive gauge pressures. The gauge pressure is defined as a pressure difference between the absolute pressure and a surrounding atmospheric pressure. A negative gauge pressure can be a vacuum or a positive pressure that is less than the surrounding atmospheric pressure.

A support tray 34 defines a lower surface 36 that supports the three-dimensional article 4. A movement mechanism 38 is configured to vertically position the support tray 34. A light engine 40 is positioned below the transparent plate 10 for transmitting or projecting radiation for selectively hardening the photocurable resin 26 onto the three-dimensional article 4. A structural support apparatus 42 provides support and alignment between the support plate 6, the movement mechanism 38, and the light engine 40.

A controller 44 is controllably coupled to various components of system 2 including controllable pressure source 32, movement mechanism 38, and light engine 40. The controller 44 includes a processor coupled to an information storage device. The information storage device includes non-volatile or non-transient portion storing software instructions. When executed by the processor, the software instructions operate controllable portions of system 2. Controller 44 can be a single integrated controller or it can includes multiple devices that can be co-located with and/or remote from illustrated portions of system 2.

Figure 2:
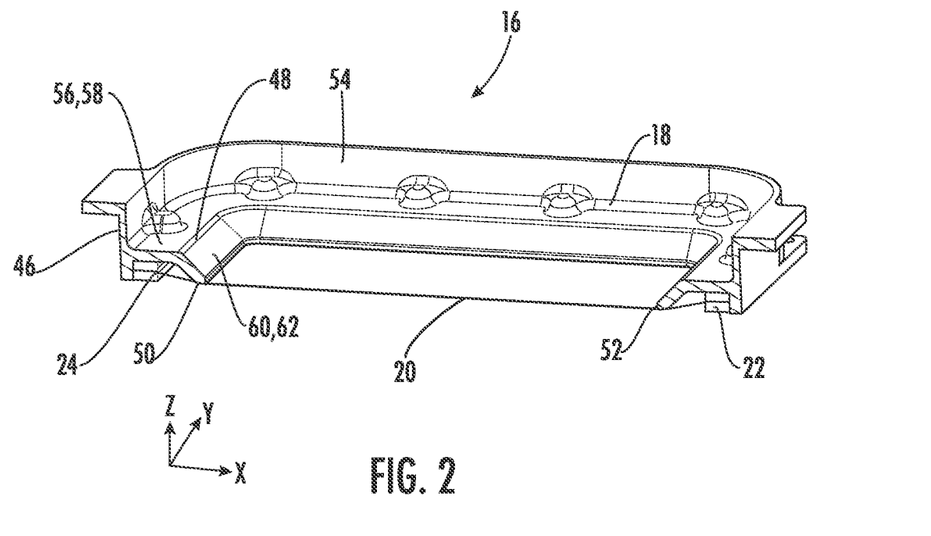
FIG. 2 is an isometric cutaway view from above of an embodiment of a resin vessel.

FIG. 2 is an isometric cutaway view from above of an embodiment of resin vessel 16. The substructure 18 includes a vertical wall 46 and tension ring 48. The tension ring 48 extends inwardly and downwardly from the vertical wall 46 to an inner edge 50. The inner edge 50 impinges upon the transparent sheet 20 along an inner boundary 52 of the transparent sheet 20. The downward impingement of the inner edge 50 along the inner boundary 52 tensions the transparent sheet 20.

The frame 22 supports the transparent sheet 20 along an outer periphery 24. The inner boundary 52 is offset laterally inwardly from the outer periphery 24.

The vertical wall 46 includes an upper inside surface 54. The tension ring 48 includes a generally horizontal outer portion 56 that extends laterally inwardly from the vertical wall 46 and defines an upper surface 58. The tension ring 48 includes a sloped inner portion 60 extending inwardly and downwardly from the outer portion 56 and defines an upper surface 62. The sloped inner portion generally defines an oblique angle with respect to vertical axis Z. Together, surfaces 54, 58, 62, and the transparent sheet 20 provide containment for the photocurable resin 26.

Figure 3:
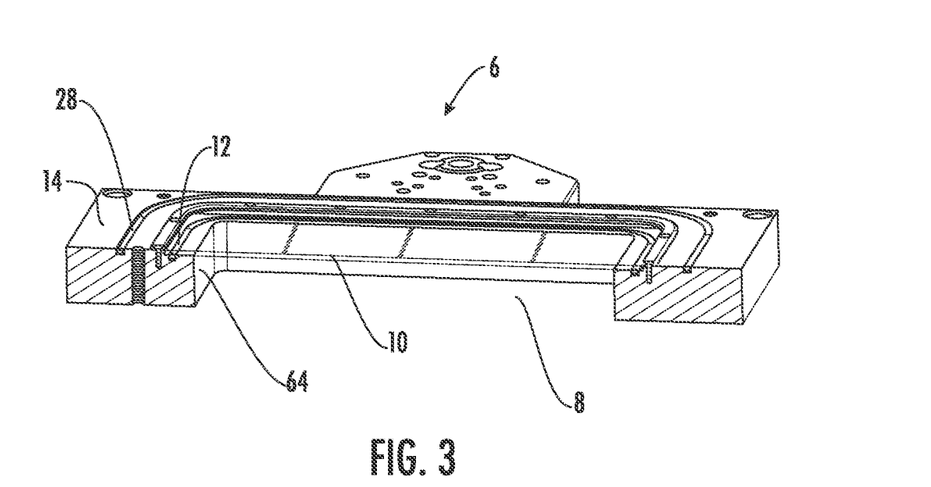
FIG. 3 is an isometric cutaway view from above of an embodiment of a support plate.

FIG. 3 is an isometric cutaway view from above of an embodiment of a support plate 6. Orientations of FIGS. 2 and 3 are generally the same. The central opening 8 in support plate 6 is defined by an inward facing wall 64. The substructure 18 of resin vessel 16 can be screwed or bolted down to the upper surface 14 of support plate 6.

Figure 4:
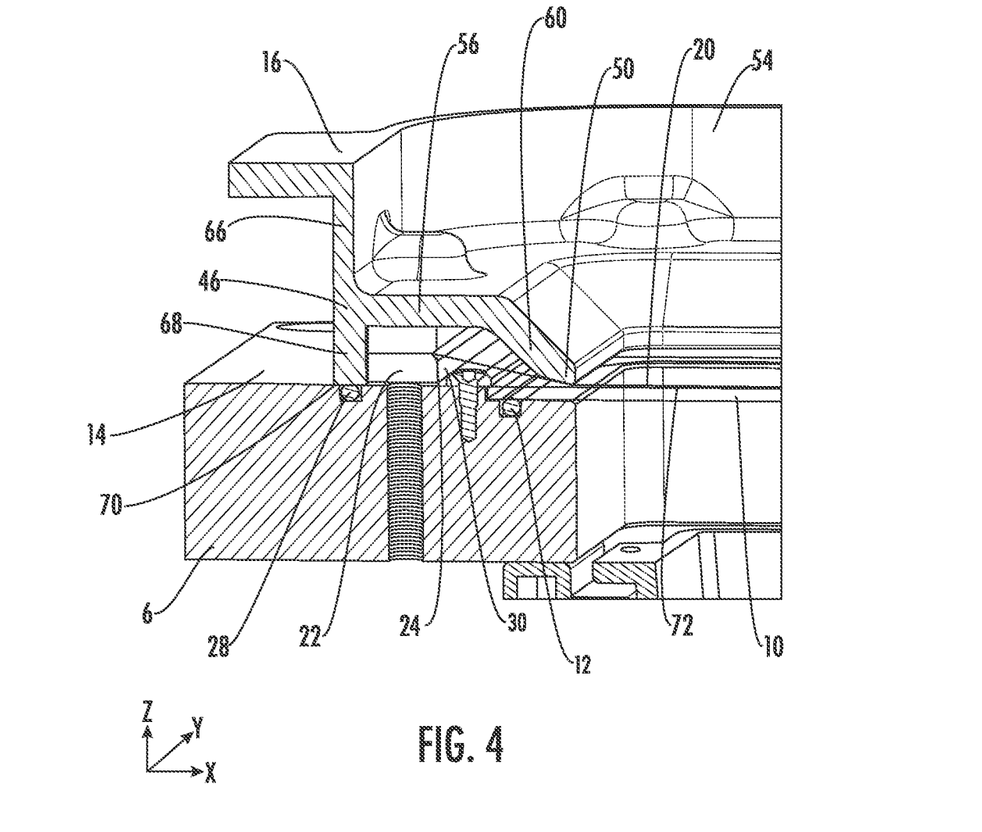
FIG. 4 is a detailed isometric cutaway view of an embodiment of a resin vessel assembled to a support plate.

FIG. 4 is a detailed isometric cutaway view of an embodiment of the resin vessel 16 assembled to the support plate 6. The vertical wall 46 has an upper portion 66 extending above the outer portion 56 of tension ring 48. Upper portion 66 defines the inside surface 54 which provides lateral containment of photocurable resin 26.

Vertical wall 46 includes a lower portion 68 that extends downwardly from the outer portion 56. The lower portion 68 defines a lower end perimeter 70 that engages and seals to the O-ring 28. This seal along with the seal between O-ring 12 and transparent plate 10 define the sealed space 30. Engagement of the lower end 70 with the upper surface 14 of support plate 6 defines a controlled vertical gap 72 between the transparent plate 10 and the transparent sheet 20.

In the illustrated embodiment, the frame 22 that clamps the outer periphery 24 of the transparent sheet 20 is mounted to a corner defined between the horizontal outer portion 56 of tension ring 48 and the lower portion 68 of vertical wall 46. The frame 22 includes upper and lower frame portions that sandwich the transparent sheet 20.

Figure 5:
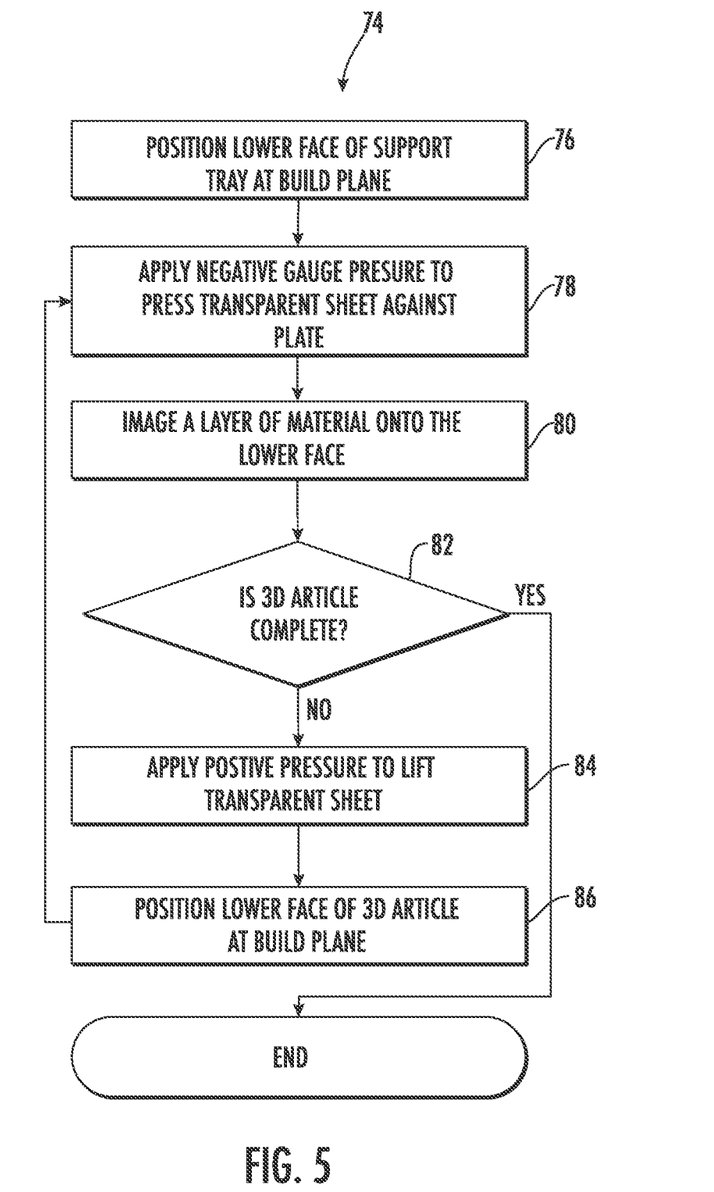
FIG. 5 is a flowchart representing an embodiment of a method for fabricating a three-dimensional article using the system depicted in FIGS. 1-4.

FIG. 5 is a flowchart representing an embodiment of a method 74 for operating system 2 to form an article 4. The steps of FIG. 5 are further illustrated by FIGS. 6A-H. FIGS. 6A-H are schematic cross sections of the assembly of the support plate 6 and resin vessel 16 during certain steps of method 74. The method steps of method 74 are performed by the controller 44 acting upon the movement mechanism 38 (for vertically moving build tray 34), light engine 40 (for defining a build plane 37 and hardening layers of photocurable resin 26), and controllable pressure source 32 (for modulating pressure in the sealed space 30).

Figure 6A:
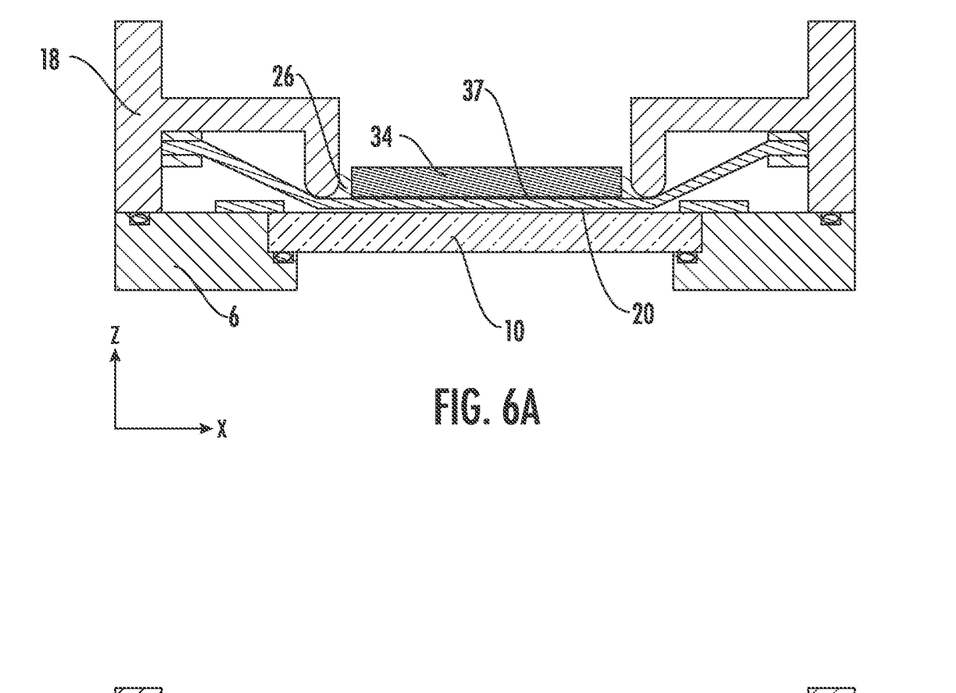
FIG. 6A is a schematic diagram of a portion of a three-dimensional printing system corresponding to step 76 of FIG. 5.
Figure 6B:
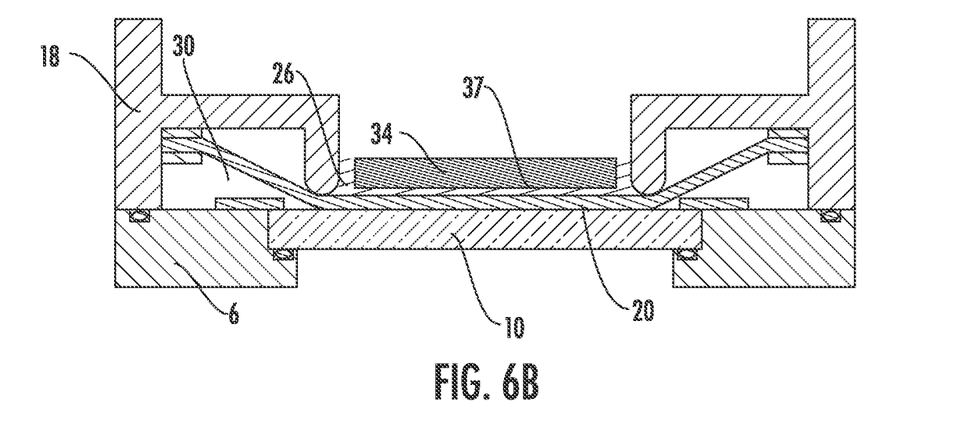
FIG. 6B is a schematic diagram of a portion of a three-dimensional printing system corresponding to step 78 of FIG. 5 before the start of forming a three-dimensional article.
Figure 6C:
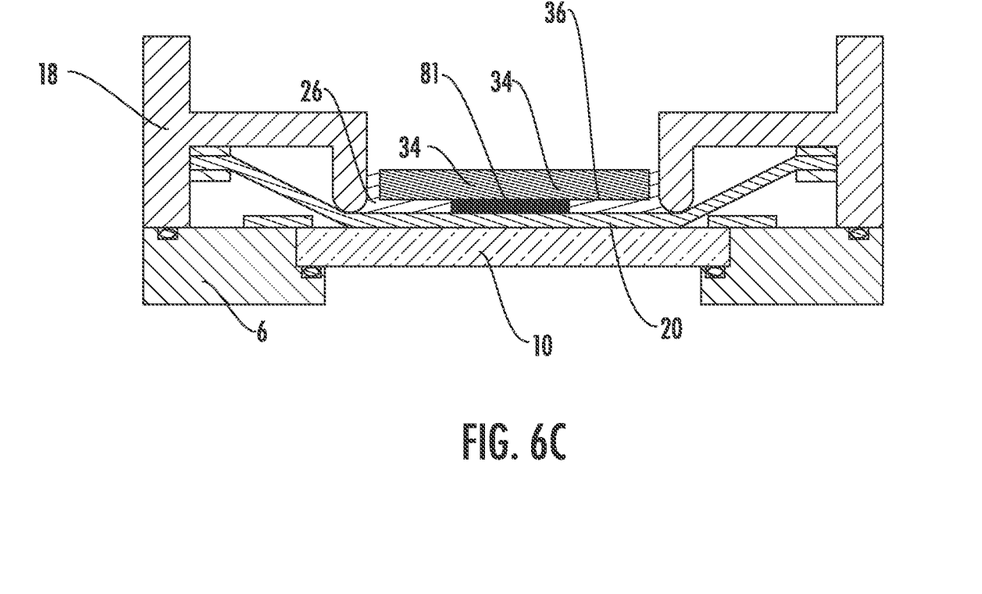
FIG. 6C is a schematic diagram of a portion of a three-dimensional printing system corresponding to step 80 of FIG. 5.

According to 76, the lower face 36 of support tray 34 is positioned at a build plane 37. This is illustrated in FIG. 6A. According to 78, a negative gauge pressure or vacuum is applied to the sealed space 30 which draws the transparent sheet 20 against the transparent plate 10. This is illustrated in FIG. 6B. Note that resin 26 then fills a space between the support tray 34 and the transparent sheet 20. According to 80, light engine 40 selectively irradiates the build plane 37 to harden a layer of resin 81 onto the lower face 36 of the support tray 34. This is illustrated in FIG. 6C.

According to 82, a determination is made as to whether fabrication of the three-dimensional article 4 is complete. If not, method 74 passes to step 84.

Figure 6D:
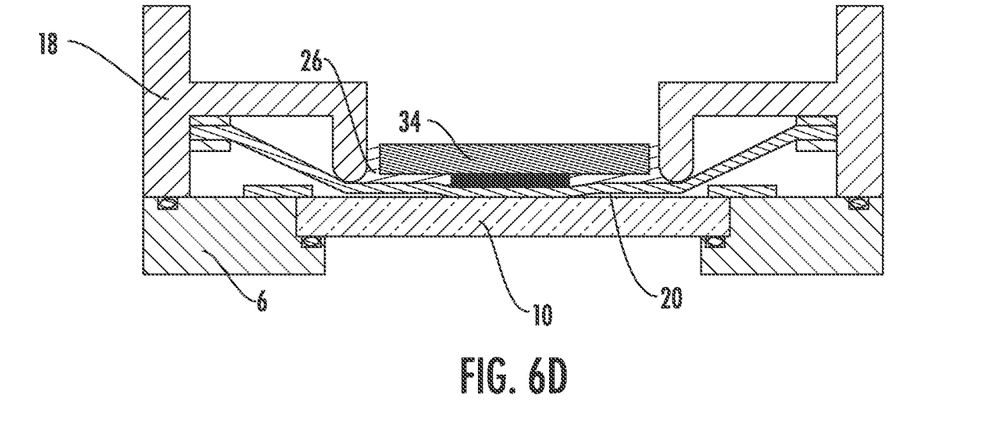
FIG. 6D is a schematic diagram of a portion of a three-dimensional printing system corresponding to step 84 of FIG. 5.

According to 84, a positive pressure is applied to the sealed space 30. This is illustrated in FIG. 6D. As can be seen, the transparent sheet 20 begins to lift off of the transparent plate 10. While the positive pressure is being applied, a lower face 5 of the article 4 is raised to the build plane 37. This is illustrated FIG. 6E—for an article 4 that is partially formed by multiple layers. Steps 78 to 86 are repeated until the article 4 is fully formed. Then, according to step 82, the process is complete and moves to step 88.

Figure 6E:
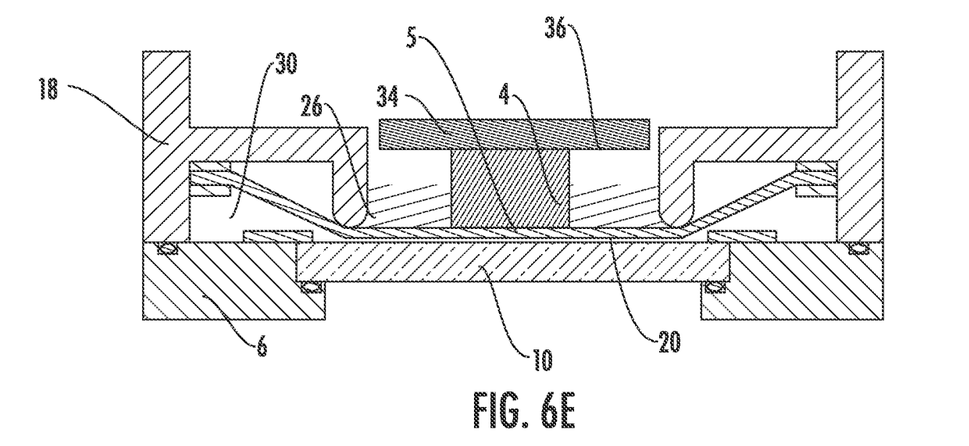
FIG. 6E is a schematic diagram of a portion of a three-dimensional printing system corresponding to step 86 of FIG. 5.
Figure 6F:
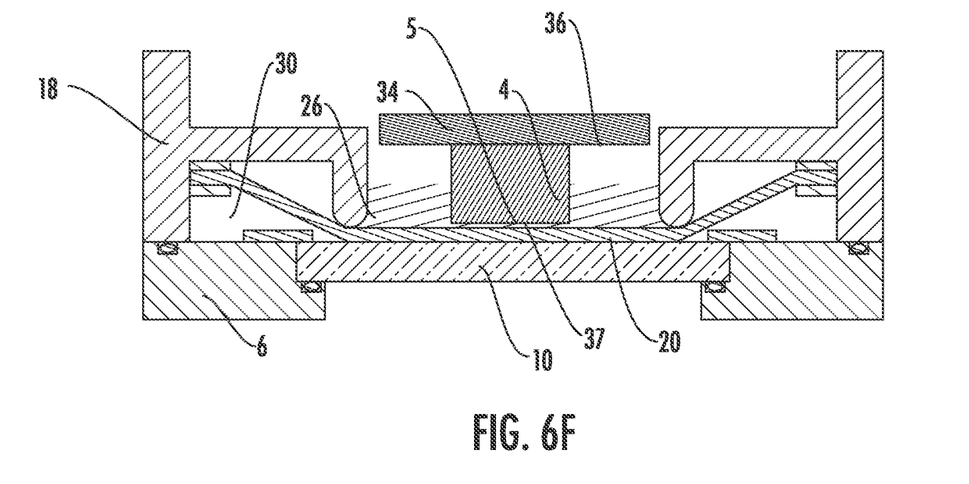
FIG. 6F is a schematic diagram of a portion of a three-dimensional printing system corresponding to a repeat of step 78 of FIG. 5 in which a three-dimensional article is partially formed.
Figure 6G:
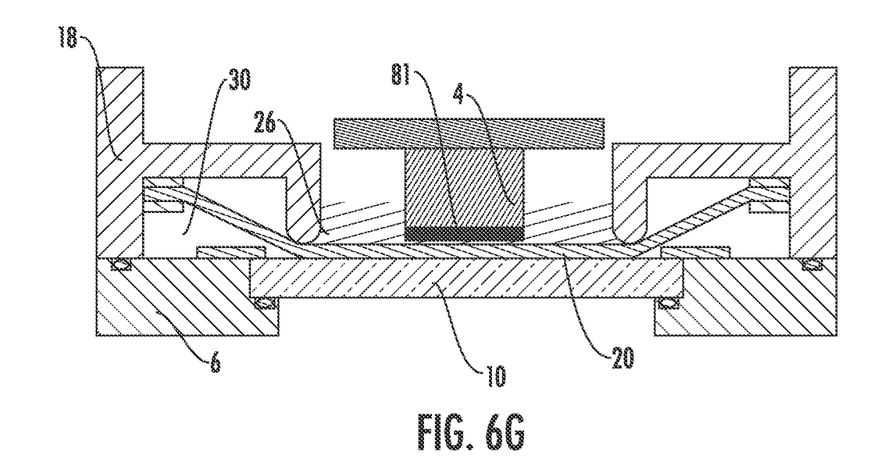
FIG. 6G is a schematic diagram of a portion of a three-dimensional printing system corresponding to a repeat of step 80 of FIG. 5.
Figure 6H:
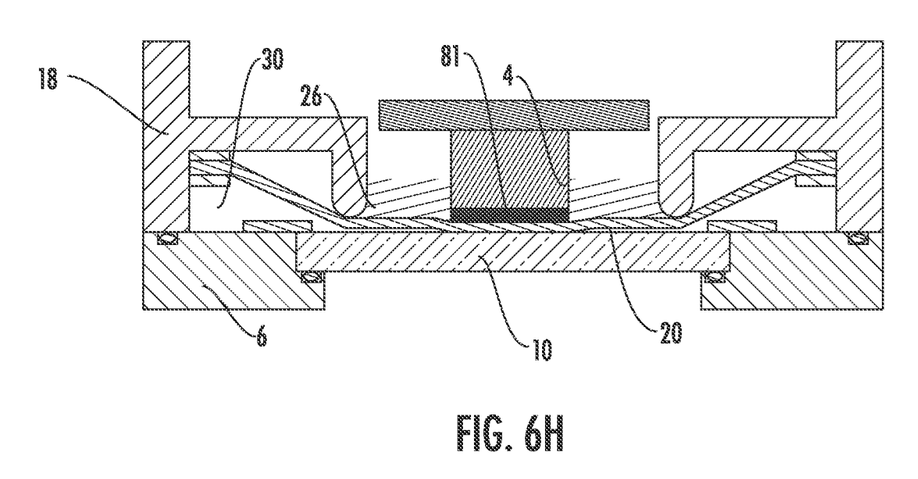
FIG. 6H is a schematic diagram of a portion of a three-dimensional printing system corresponding to a repeat of step 84 of FIG. 5.

As a note, FIG. 6F illustrates a repeat of step 78 after the three-dimensional article 4 is partially formed. FIG. 6G illustrates a repeat of step 80 after the three-dimensional article 4 is partially formed. FIG. 6H illustrates a repeat of step 84 after the three-dimensional article 4 is partially formed. FIG. 6E also represents a repeat of step 86 after the three-dimensional article 4 is partially formed.

Controller 44 operates the controllable pressure source 32 to perform steps 78 and 84. Controller 44 operates the movement mechanism 38 to perform steps 76 and 86. Controller 44 operates the light engine 40 to perform step 80.

In some embodiments, the transparent sheet 20 is permeable to oxygen. Oxygen is an inhibitor to polymerizing the photocurable resin 26. Oxygen diffusing through sheet 20 assures that the build plane 37 is above and slightly spaced from the transparent sheet 20. Between the transparent sheet 20 and the build plane 37 is a thin zone of unpolymerized resin 26. In some implementations, gas introduced to the sealed space 30 can provide a controlled partial pressure of oxygen in the sealed space 30. This in turn can control a thickness of the unpolymerized zone.

In some embodiments without use of an inhibitor, the build plane 37 is at the top surface of the transparent sheet 20. After a layer of resin 81 is hardened onto the lower face 36, the hardened resin will tend to stick to the transparent sheet 20. The transparent sheet 20 can then be peeled away from the layer of resin 81 by execution of steps 84, 86, and then 78.

The specific embodiments and applications thereof described above are for illustrative purposes only and do not preclude modifications and variations encompassed by the scope of the following claims.

What is claimed is:

1. A method of manufacturing a three-dimensional article comprising:
   providing a three dimensional printing system having a resin vessel that further includes:
   a transparent sheet; and
   a substructure including a wall and a tension ring;
   tensioning a transparent sheet above a transparent plate with a sealed gap therebetween wherein tensioning the transparent sheet includes impinging the tension ring upon an inner boundary of an upper surface of the transparent sheet;
   positioning a lower face of a partially formed three-dimensional article within photocurable resin at a build plane above the transparent sheet;
   operating a pressure source to apply a negative gauge pressure to the sealed gap and to press a lower surface of the transparent sheet against an upper surface of the transparent plate;
   operating a light engine to selectively image a layer of the photocurable resin onto the lower face;
   operating the pressure source to apply a positive gauge pressure to the sealed gap and to at least partially lift the transparent sheet from the transparent plate;
   raising the lower face to reposition the lower face at the build plane;
   operating the pressure source to again apply the negative gauge pressure and to again press the lower surface of the transparent sheet against the upper surface of the transparent plate, and;
   operating the light engine to selectively image another layer of the photocurable resin onto the lower face.

2. The method of claim 1 wherein during raising the lower face the transparent sheet fully lifts from the transparent plate.

3. The method of claim 1 wherein tensioning the transparent sheet includes supporting a peripheral edge of the transparent sheet above the inner boundary of the upper surface of the transparent sheet.

4. The method of claim 3 wherein the three-dimensional printing system includes a frame that supports the peripheral edge of the transparent sheet, tensioning the transparent sheet includes mounting the frame to the substructure.

5. The method of claim 4 wherein mounting the frame to the substructure includes mounting the frame to a corner defined between a horizontal outer portion of the tension ring and the wall.

6. The method of claim 1 further comprising containing the photocurable resin through cooperation of the transparent sheet, the wall, and the tension ring.

7. The method of claim 1 wherein the substructure, the support plate, and the lower surface of the transparent sheet cooperate to define a sealed space that is fluidically coupled to the sealed gap, operating the pressure source includes applying the negative gauge pressure to the sealed space.

8. The method of claim 7 wherein the three-dimensional printing system includes a support plate having a central opening, the transparent plate closes the central opening and the method further comprising sealing a lower portion of the wall to an upper surface of the support plate.

9. A method of manufacturing a three-dimensional article comprising:
providing a support plate having a central opening closed by a transparent plate;
affixing a resin vessel upon the support plate, the resin vessel including a transparent sheet, a wall, and a tension ring, the transparent sheet supported along a peripheral edge, the tension ring engaging and tensioning the transparent sheet along an inner boundary, a sealed space is defined between the transparent sheet and the transparent plate, photocurable resin is contained over the transparent sheet;
positioning a lower face of a partially formed the three-dimensional article within the photocurable resin at a build plane above the transparent sheet;
operating a pressure source to apply a negative gauge pressure to the sealed space and to press the transparent sheet against the transparent plate; and
operating a light engine to selectively image a layer of the photocurable resin onto the lower face.

10. The method of claim 9 wherein affixing the resin upon the support plate includes sealing a lower end perimeter of the wall to an upper surface of the support plate.

11. The method of claim 9 wherein the sealed space is contained between the wall, the tension ring, the transparent sheet and the upper surface of the support plate.

12. The method of claim 9 wherein the wall includes an upper portion that extends above the tension ring and a lower portion that extends to the lower end perimeter.

13. The method of claim 9 wherein the photocurable resin is contained by and in contact with at least the tension ring and the transparent sheet.

14. The method of claim 13 wherein the photocurable resin is further contained by the wall.

15. The method of claim 9 further comprising:
operating the pressure source to apply a positive gauge pressure to the sealed space;
raising the lower face to reposition the lower face at the build plane, the combination of applying the positive gauge pressure and raising the lower face operate to lift the transparent sheet off of the transparent plate and to establish a sealed gap between the transparent plate and the transparent sheet.

16. A method of manufacturing a three-dimensional article comprising:
providing a support plate having a central opening closed by a transparent plate;
tensioning a transparent sheet with a tension ring, the tension ring coupled to a wall;
affixing the wall to the support plate with a sealed gap between the transparent sheet and the transparent plate;
providing photocurable resin above the transparent sheet, the photocurable resin contained at least by the tension ring and the transparent sheet;
positioning a lower face of a partially formed three-dimensional article within photocurable resin at a build plane above the transparent sheet;
operating a pressure source to apply a negative gauge pressure to the sealed gap and to press a lower surface of the transparent sheet against an upper surface of the transparent plate;
operating a light engine to selectively image a layer of the photocurable resin onto the lower face;
operating the pressure source to apply a positive gauge pressure to the sealed gap; and
raising the lower face to reposition the lower face at the build plane, the combination of applying the positive gauge pressure and raising the lower face operate to lift the transparent sheet off of the transparent plate and to establish a sealed gap between the transparent plate and the transparent sheet.

* * * * *